(12) United States Patent
Salmela et al.

(10) Patent No.: US 12,401,986 B2
(45) Date of Patent: Aug. 26, 2025

(54) REMOTE SUBSCRIPTION PROFILE DOWNLOAD

(71) Applicant: Telefonaktiebolaget LM Ericsson (publ), Stockholm (SE)

(72) Inventors: Patrik Salmela, Espoo (FI); Kazi Wali Ullah, Espoo (FI); Abu Shohel Ahmed, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 449 days.

(21) Appl. No.: 18/011,682

(22) PCT Filed: Jun. 26, 2020

(86) PCT No.: PCT/EP2020/068101
§ 371 (c)(1),
(2) Date: Dec. 20, 2022

(87) PCT Pub. No.: WO2021/259499
PCT Pub. Date: Dec. 30, 2021

(65) Prior Publication Data
US 2023/0300596 A1    Sep. 21, 2023

(51) Int. Cl.
*H04W 60/00* (2009.01)
*H04W 8/18* (2009.01)
*H04W 12/06* (2021.01)
*H04W 12/72* (2021.01)
*H04W 60/04* (2009.01)

(52) U.S. Cl.
CPC ............ *H04W 8/18* (2013.01); *H04W 12/06* (2013.01); *H04W 12/72* (2021.01); *H04W 60/04* (2013.01)

(58) Field of Classification Search
None
See application file for complete search history.

(56) References Cited

U.S. PATENT DOCUMENTS

| | | |
|---|---|---|
| 2018/0146364 A1 | 5/2018 | Coureau et al. |
| 2019/0373448 A1 | 12/2019 | Gao |
| 2020/0052907 A1 | 2/2020 | Park et al. |
| 2023/0189187 A1* | 6/2023 | Velev .................... H04W 48/16 455/435.1 |

OTHER PUBLICATIONS

International Search Report and Written Opinion of the International Searching Authority, PCT/EP2020/068101, mailed Nov. 25, 2020, 13 pages.

(Continued)

*Primary Examiner* — Gary Lafontant
(74) *Attorney, Agent, or Firm* — Sage Patent Group

(57) ABSTRACT

There is provided mechanisms for enabling subscription profile download to a subscriber entity. A method is performed by a network node of an SNPN. The method comprises receiving a request from the subscriber entity for network registration with EAP based authentication to the SNPN. The method comprises granting network connectivity for the subscriber entity to the SNPN by completing the network registration upon successful EAP based authentication of the subscriber entity and upon verification that there is a pending subscription profile available for download to the subscriber entity. The network connectivity enables subscription profile download to the subscriber entity.

19 Claims, 9 Drawing Sheets

(56) References Cited

OTHER PUBLICATIONS

3GPP, Technical Specification Group Services and System Aspects, "Study on Enhanced Support of Non-Public Networks (Release 17)", XP051902986, Jun. 19, 2020, Valbonne, France, 159 pages.
GSM Association, "SGP.22 RSP Technical Specification", XP055748263, Jun. 5, 2020, Version 2.2.2, 100 pages.
GSM Association, "SGP.22 RSP Technical Specification", Version 2.2.2, 57 pages.
5G ACIA, "5G Non-Public Networks for Industrial Scenarios", Jul. 2019, 24 pages.
GSM Association, "SGP.22 RSP Technical Specification", Version 2.2.2, 85 pages.
3GPP TR 23.700-07 V0.3.0, Technical Specification Group Services and System Aspects, "Study on Enhanced Support of Non-Public Networks (Release 17)", XP051902986, Jan. 2020, Valbonne, France, 41 pages.
5G Alliance for Connected Industries and Automation (5G ACIA), "5G Non-Public Networks for Industrial Scenarios", Jul. 2019, ZVEI—German Electrical and Electronic Manufacturers' Association, Frankfurt am Main, Germany, 24 pages.

\* cited by examiner

US 12,401,986 B2

REMOTE SUBSCRIPTION PROFILE DOWNLOAD

CROSS REFERENCE TO RELATED APPLICATIONS

This application is a 35 U.S.C. § 371 national stage application of PCT International Application No. PCT/EP2020/068101 filed on Jun. 26, 2020, the disclosure and content of which is incorporated by reference herein in its entirety.

TECHNICAL FIELD

Embodiments presented herein relate to a method, a network node of a stand-alone non-public network (SNPN), a computer program, and a computer program product for enabling subscription profile download to a subscriber entity. Further embodiments presented herein relate to a method, a subscriber entity, a computer program, and a computer program product for subscription profile download. Further embodiments presented herein relate to a method, a subscription management server, a computer program, and a computer program product for assisting the network node to enable subscription profile download to the subscriber entity.

BACKGROUND

Remote SIM provisioning (RSP; where SIM is short for subscriber identity module) for consumer devices is described in "SGP.22-RSP Technical Specification", Version 2.2.1, 18 Dec. 2018, published by the GSM Association. According to this document, firstly, the subscriber makes a contract with a mobile network operator (MNO). Secondly, the MNO orders a profile for the subscriber entity from a server (enhanced Subscription Manager Data Preparation (SM-DP+) server), and the SM-DP+ creates the profile and returns to the MNO a pointer to the profile. Thirdly, the MNO delivers the pointer for download initialization of the profile to the subscriber. Fourthly, the profile is downloaded from the SM-DP+ to the embedded universal integrated circuit card (eUICC) in the communication device to be provisioned. Section 3.1 of the aforementioned document describes the profile download initiation process. It indicates how the user orders a subscription from the MNO. Request/response methods are used for the MNO to request the SM-DP+ to create a SIM profile. The profile is then stored securely in the SM-DP+. After profile creation, the subscriber entity can download the created profile by contacting the SM-DP+ using the communication device.

The above referred technical specification documents suggest that the device to be provisioned (denoted companion device) can be managed through a primary device (e.g., a User Equipment), which can e.g. provide global connectivity (through e.g. WiFi tethering) to the device to be provisioned and act as the input device for entering e.g. the activation code of the device to be provisioned. The technical specification SGP.22 also defines a GetEID function that can be used for retrieving the EID of the device to be provisioned.

However, it could be that, for form factor reasons or cost reasons, the device to be provisioned is not provided with the necessary communication interfaces, such as a communication interface for Bluetooth or WiFi communication, for communicating with the primary device. There is therefore a need for improved remote provisioning of subscription profiles to subscriber entities, such as eUICCs.

SUMMARY

An object of embodiments herein is to enable efficient remote provisioning of a subscription profile to a subscriber entity.

According to a first aspect there is presented a method for enabling subscription profile download to a subscriber entity. The method is performed by a network node of an SNPN. The method comprises receiving a request from the subscriber entity for network registration with EAP based authentication to the SNPN. The method comprises granting network connectivity for the subscriber entity to the SNPN by completing the network registration upon successful EAP based authentication of the subscriber entity and upon verification that there is a pending subscription profile available for download to the subscriber entity. The network connectivity enables subscription profile download to the subscriber entity.

According to a second aspect there is presented a network node of an SNPN for enabling subscription profile download to a subscriber entity. The network node comprises processing circuitry. The processing circuitry is configured to cause the network node to receive a request from the subscriber entity for network registration with EAP based authentication to the SNPN. The processing circuitry is configured to cause the network node to grant network connectivity for the subscriber entity to the SNPN by completing the network registration upon successful EAP based authentication of the subscriber entity and upon verification that there is a pending subscription profile available for download to the subscriber entity. The network connectivity enables subscription profile download to the subscriber entity.

According to a third aspect there is presented a computer program for enabling subscription profile download to a subscriber entity. The computer program comprises computer program code which, when run on processing circuitry of a network node of a SNP, causes the network node to perform a method according to the first aspect.

According to a fourth aspect there is presented a method for subscription profile download. The method is performed by a subscriber entity. The method comprises providing a request for network registration with EAP based authentication to an SNPN. The method comprises gaining network connectivity to the SNPN upon successful EAP based authentication of the subscriber entity and upon verification that there is a pending subscription profile available for download to the subscriber entity. The method comprises obtaining event information of the subscription profile. The method comprises downloading the subscription profile to the subscriber entity whilst utilizing the network connectivity to the SNPN.

According to a fifth aspect there is presented a subscriber entity for subscription profile download. The subscriber entity comprises processing circuitry. The processing circuitry is configured to cause the subscriber entity to provide a request for network registration with EAP based authentication to an SNPN. The processing circuitry is configured to cause the subscriber entity to gain network connectivity to the SNPN upon successful EAP based authentication of the subscriber entity and upon verification that there is a pending subscription profile available for download to the subscriber entity. The processing circuitry is configured to cause the subscriber entity to obtain event information of the subscription profile. The processing circuitry is configured to cause the subscriber entity to download the subscription profile to the subscriber entity whilst utilizing the network connectivity to the SNPN.

According to a sixth aspect there is presented a computer program for subscription profile download. The computer program comprises computer program code which, when run on processing circuitry of a subscriber entity, causes the subscriber entity to perform a method according to the fourth aspect.

According to a seventh aspect there is presented a method for assisting a network node of an SNPN to enable subscription profile download to a subscriber entity. The method is performed by a subscription management server. The method comprises obtaining, from the network node, a trigger for the subscription management server to verify that a pending subscription profile is available for download to the subscriber entity. The method comprises, then, providing an indication to the network node that the pending subscription profile is available for download to the subscriber entity. The indication assists the network node to enable subscription profile download to the subscriber entity.

According to an eighth aspect there is presented a subscription management server for assisting a network node of an SNPN to enable subscription profile download to a subscriber entity. The subscription management server comprises processing circuitry. The processing circuitry is configured to cause the subscription management server to obtain, from the network node, a trigger for the subscription management server to verify that a pending subscription profile is available for download to the subscriber entity. The processing circuitry is configured to cause the subscription management server to, then, provide an indication to the network node that the pending subscription profile is available for download to the subscriber entity. The indication assists the network node to enable subscription profile download to the subscriber entity.

According to a tenth aspect there is presented a computer program for assisting a network node of an SNPN to enable subscription profile download to a subscriber entity, the computer program comprising computer program code which, when run on processing circuitry of a subscription management server, causes the subscription management server to perform a method according to the seventh aspect.

According to an eleventh aspect there is presented a computer program product comprising a computer program according to at least one of the third aspect, the sixth aspect, and the tenth aspect and a computer readable storage medium on which the computer program is stored. The computer readable storage medium can be a non-transitory computer readable storage medium.

Advantageously these aspects enable efficient remote provisioning of a subscription profile to the subscriber entity.

Advantageously, according to these aspects, the subscriber entity is enabled to gain initial network connectivity even without a valid subscription in order to download a proper subscription profile.

Advantageously, according to these aspects, already provisioned subscriber entities are prevented from gaining network connectivity through the SNPN, thus lessening the burden on the SNPN.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise.

The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to mechanisms for enabling subscription profile download to a subscriber entity. In order to obtain such mechanisms there is provided a network node of an SNPN, a method performed by the network node, a computer program product comprising code, for example in the form of a computer program, that when run on processing circuitry of the network node, causes the network node to perform the method. In order to obtain such mechanisms there is further provided a subscriber entity, a method performed by the subscriber entity, and a computer program product comprising code, for example in the form of a computer program, that when run on processing circuitry of the subscriber entity, causes the subscriber entity to perform the method. In order to obtain such mechanisms there is further provided a subscription management server, a method performed by the subscription management server, and a computer program product comprising code, for example in the form of a computer program, that when run on processing circuitry of the subscription management server, causes the subscription management server to perform the method.

Figure 1:
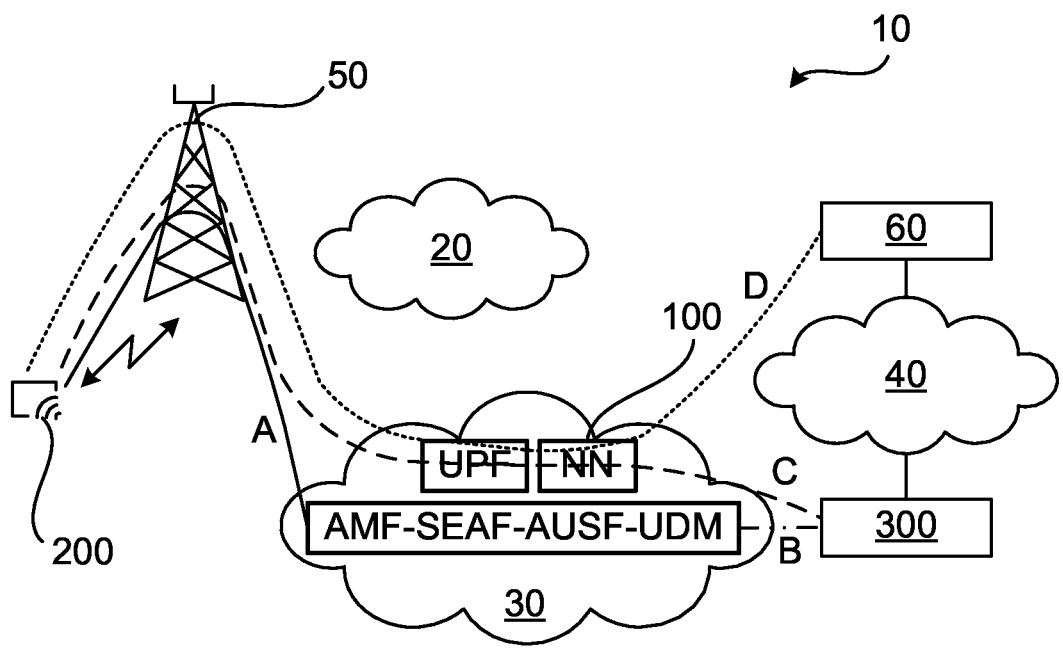
FIG. 1 is a schematic diagram illustrating a communication network according to embodiments.

FIG. 1 is a schematic diagram illustrating a communication network 10 where embodiments presented herein can be applied. The communications network 10 comprises a number of sub-networks; a public land mobile network (PLMN) 20, an SNPN 30, and a service data network 40, such as the Internet. The PLMN 20 and the SNPN 30 are operatively connected to the service data network 40. Network access to the PLMN 20 and the SNPN 30 for a subscriber entity 200 is provided by a (radio) access network ((R)AN) node 50, representing a (radio) access network. The SNPN 30 comprises entities, as represented by network node 100. The service data network 40 comprises, or is operatively connected to, a subscription provisioning server 60, such as a SM-DP+, and a subscription management server 300, such as a SM-DS. The subscriber entity might be any of: an embedded Subscriber Identity Module (eSIM), an embedded Universal Integrated Circuit Card (eUICC) entity, an integrated Universal Integrated Circuit Card (iUICC) entity, a European Telecommunications Standards Institute Smart Secure Platform, (ETSI SSP), or the like. The subscriber entity might be provided in a portable wireless device, mobile station, mobile phone, handset, wireless local loop phone, user equipment (UE), smartphone, laptop computer, tablet computer, consumer IoT device, machine type IoT device, network equipped sensor, vehicle equipped sensor, or the like.

Further details of the SNPN will now be disclosed. In addition to the public land mobile networks (PLMN), non-public networks (NPNs) have been defined for the fifth generation (5G) telecommunications systems. This implies that at least parts of the 5G telecommunications systems are operated by a private network operator which only allows certain pre-registered clients to attach to it. How the network functionality is split between the private network operator and a public network operator can vary; all functionality can be provided by the private network operator, or parts, e.g. (R) AN and/or control plane functionalities can be provided by the public network operator as a service for the private network operator. The NPN might in some aspects be regarded as a stand-alone NPN (SNPN), even if the (R) AN is provided by the public network operator. For SNPNs, any EAP based authentication procedure can be used, and e.g. certificates could be used instead of traditional SIM credentials (international mobile subscriber identity (IMSI) and subscriber key). When performing EAP based authentication in a 5G core network, the Security Anchor Function (SEAF) acts as the EAP authenticator and the Authentication Server Function (AUSF) acts as the EAP (authentication) server, with the Unified Data Manager (UDM) being the credential database.

When an NPN is accessed via a public network operator the (radio) access network node of the public network might advertise the network identifier (NID) of the private network(s) reachable through it. Globally unique NIDs can be assigned such that each NID is either globally unique, independent of the PLMN ID used, or so that the combination of each NID and PLMN ID is globally unique. Different combinations of PLMN ID and NID might point towards the same 5G core network. When accessing an SNPN using the (R) AN of a PLMN, the Subscription Permanent Identifier (SUPI) of the communication device can include the NID as the realm part of the Network Access Identifier (NAI). In this way the request can be forwarded by the (R) AN to the SNPN instead of the PLMN.

Reference is continued to FIG. 1 with reference to steps A, B, C, D for disclosure of a method for enabling subscription profile download to a subscriber entity 200 based on at least some of the embodiments disclosed herein.

The subscriber entity 200 might be pre-programmed (by the manufacturer) with at least one NID used for subscriber entity 200 initial network connectivity. The SNPNs 30 that will provide this service of providing subscriber entity 200 initial network connectivity should serve this at least one NID, i.e. the PLMNs 20 providing a (R) AN to the SNPNs 30 need to advertise this at least one NID on behalf of the SNPNs 30. Each NID could be either globally unique or become globally unique only when combined with a PLMN ID. In both cases the NID would still be served by many PLMNs 20. Either approach could be used according to the herein disclosed embodiments.

Step A: Initial Network Connectivity to (Global) Provisioning SNPN 30

When the subscriber entity 200 is switched on, and it does not have any existing subscription profile that can provide it with network connectivity (or if no subscription profile is active), the subscriber entity 200 will scan for the NID that has been pre-programmed to the subscriber entity 200 as a NID for subscription profile provisioning. Any PLMN 20 advertising the NID via its (R) AN or otherwise broadcasting information indicating that provisioning can be done through it, is a valid choice for the subscriber entity 200.

The subscriber entity 200 also (at some point before sending the first message) generates a SUPI using the (global) provisioning NID in the realm part of the SUPI. For EAP-TLS based authentication the client certificate, which can be seen as the identity of the subscriber entity 200, is sent later in the exchange. Therefore, the identity part of the SUPI could be any of: a public key, hash of public key, random data, static data, empty—as the actual identity is provided later. As the subscriber entity 200 does not know the public key of the SNPN 30 it cannot encrypt the identity part of the SUPI to generate a Subscription Concealed Identifier (SUCI). However, the identity part is not relevant to the SNPN 30, which instead uses the certificate (or public key thereof) sent later as the actual identity of the subscriber entity 200. In some aspects, only the realm part of the SUPI is sent as SUCI, without the username/identity part. In this way, if EAP-TLS is used, privacy is preserved, especially if TLS provides privacy.

The subscriber entity 200 initiates the network registration procedure with a (R) AN advertising the (global) provisioning NID. The registration message is by the (R) AN forwarded to the SNPN 30 based on the NID used as realm part of SUPI/SUCI of the subscriber entity 200.

The SNPN 30 implements at least the functions necessary for authentication, as well as User Plane Function (UPF) for providing global network connectivity for performing the actual subscription profile provisioning, and the SNPN 30 might perform Extensible Authentication Protocol Transport Layer Security (EAP-TLS) based authentication with the subscriber entity 200. The subscriber entity 200 is authenticated to the SNPN 30 using e.g. its EID and associated certificate, which has been issued by the Certificate Issuer (CI). The SNPN 30 is authenticated to the subscriber entity 200 using the certificate that has been issued by the same CI. In this respect, the CI might also issue a certificate to the SNPN(s) 30 that are going to provide network connectivity for provisioning purposes. Such a certificate can be used for authenticating the SNPN(s) 30 towards the subscriber entity 200 as a trusted network based on the SNPN(s) 30 having a certificate issued by the trusted CI.

As an alternative the authentication of the subscriber entity 200 is performed with an external, authentication, authorization, and accounting (AAA) server, such as the subscription management server 300. This would require that the subscription management server 300 supports EAP based authentication and that the SNPN 30 trusts the subscription management server 300 to act as AAA server for clients of the SNPN 30.

Step B: Authorizing Device for Access to the (Global) Provisioning SNPN 30

As part of authentication of the subscriber entity 200, and before granting network access to the subscriber entity 200, i.e. before sending an EAP SUCCESS MESSAGE to the subscriber entity 200, the SNPN 30 connects to the subscription management server 300 to check whether there are any pending subscription profile download events for the subscriber entity 200 that has just authenticated. This filters out subscriber entities 200 that do not have subscription profile downloads pending but still try to access the SNPN 30. This thus saves resources in the SNPN 30 and partially protects against misuse of the SNPN 30. An interface between the SNPN 30 and the subscription management server 300 could be based on any of the following alternatives.

According to a first alternative, the SNPN 30 has a CI signed certificate with metadata indicating it is an SNPN 30 for subscriber entity 200 provisioning, i.e. it would have different access rights towards the subscription management server 300. Subscriber entities 200 would only be able to fetch their own subscription profile download events from the subscription management server 300, whilst the SNPN 30 would be allowed to fetch subscription profile download events of any subscriber entities 200.

According to a second alternative, instead of providing the complete details of the subscription profile download event to the SNPN 30, the subscription management server 300 only provides a true/false answer regarding whether there is any subscription profile download event for the queried subscriber entity 200, i.e. does not provide the complete details of the subscription profile download event, to the SNPN 30.

Once the subscription management server 300 has informed the SNPN 30 that there is indeed a subscription profile download event pending for the subscriber entity 200 that has just authenticated to the SNPN 30, the SNPN 30 can grant network access to the subscriber entity 200 for user plane traffic. If no subscription profile download event is pending, the SNPN 30 responds with an error message to the subscriber entity 200, indicating that the registration was rejected, possibly with a reason, such as service not allowed. This implies that only subscriber entities 200 that actually have a subscription profile waiting to be downloaded would get network access to the SNPN 30.

Step C: Locating Provisioning Server

The subscriber entity 200 obtains information related to the subscription profile download event. Two alternatives of how the subscriber entity 200 could obtain the information related to the subscription profile download event will be presented next.

According to a first alternative, the SNPN 30 verifies that there is a subscription profile download event for the subscriber entity 200 in the subscription management server 300, and the SNPN 30 could optionally learn the content of the subscription profile download event. If the SNPN 30 learns the content of the subscription profile download event, the SNPN 30 could communicate this information to the subscriber entity 200, e.g. in the form of an AC (i.e. the same format the provisioning information is provided to the user when he registers for a subscription from a mobile network operator). The subscriber entity 200 does thereby not need to connect to the subscription management server 300 to fetch the subscription profile download event.

According to a second alternative, if the content of the subscription profile download event has not been communicated to the subscriber entity 200 by the SNPN 30, after completing network registration with the SNPN 30, the subscriber entity 200 can connect to the subscription management server 300 through the UPF of the SNPN 30. The SNPN 30/UPF can implement filtering/limitations for which network services the subscriber entity 200 is allowed access, e.g. only allowing connections to services with CI issued certificates, thereby limiting the network connectivity to only subscription provisioning servers 60 and subscription management server 300s.

Step D: Subscription Profile Provisioning of Subscriber Entity 200

The subscriber entity 200 connects to the subscription provisioning server 60 indicated by the subscription profile download event obtained from the subscription management server 300 to download the subscription profile. The SNPN 30 allows the connection to the subscription provisioning server 60 based on any of the following alternatives:

According to a first alternative, there is a static pre-configuration of trusted subscription provisioning servers 60.

According to a second alternative, there is a dynamic configuration by the SNPN 30 of subscription provisioning servers 60 based on information learned from the subscription profile download event fetched from the subscription management server 300.

In some examples, the SNPN 30 configures subscriber entity 200 specific rules to the UPF e.g. based on the information obtained from the subscription management server 300; if the SNPN 30 has fetched the content of the subscription profile download event in the subscription management server 300, the subscriber entity 200 specific rules could specify to only allow network connectivity of the subscriber entities 200 to the subscription provisioning server 60 indicated in the subscription profile download event.

According to a fourth alternative, the SNPN 30 inspects the traffic flow between the subscriber entity 200 and the subscription provisioning server 60 and verifies that the subscription provisioning server 60 has a CI issued certificate, e.g. by connecting to the subscription provisioning server 60 itself and verifying it (and after that potentially adding the subscription provisioning server 60 to a configuration list of trusted subscription provisioning servers 60.

When the subscriber entity 200 has successfully downloaded and installed a new subscription profile, according to subscriber entity 200 provisioning specification, the subscriber entity 200 can start using its downloaded subscription, instead of the SNPN 30 provisioning network, for network connectivity.

Figure 2:
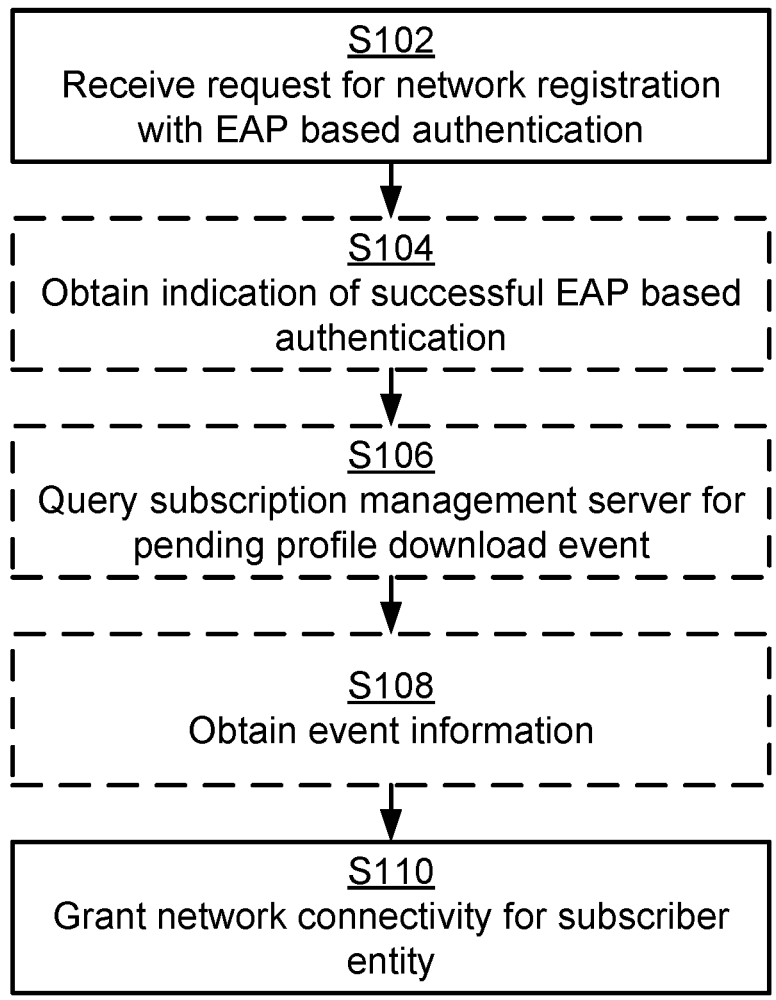
FIGS. 2, 3, and 4 are flowcharts of methods according to embodiments.

Reference is now made to FIG. 2 illustrating a method for enabling subscription profile download to a subscriber entity 200 as performed by the network node 100 of the SNPN 30 according to an embodiment.

S102: The network node 100 receives a request from the subscriber entity 200 for network registration with EAP based authentication to the SNPN 30. As part of network registration, EAP based authentication is performed between the subscriber entity 200 and the network node 100.

S110: The network node 100 grants network connectivity for the subscriber entity 200 to the SNPN 30 by completing the network registration upon successful EAP based authentication of the subscriber entity 200 and upon verification that there is a pending subscription profile available for download to the subscriber entity 200. The network connectivity enables subscription profile download to the subscriber entity 200.

Embodiments relating to further details of enabling subscription profile download to a subscriber entity 200 as performed by the network node 100 will now be disclosed.

There could be different types of EAP based authentication procedures. In some embodiments, the EAP based authentication is based on EAP-TLS authentication of the subscriber entity 200. In some embodiments, the EAP based authentication comprises verifying a CI issued certificate of the subscriber entity 200 or an identifier of the subscriber entity 200. In some examples, the network node 100 is authenticated to the subscriber entity 200 using the certificate that has been issued by the same CI as issued the certificate for the subscriber entity 200. In some embodiments, the EAP based authentication of the subscriber entity 200 is performed by the network node 100. In some embodiments, the EAP based authentication of the subscriber entity 200 is performed by the subscription management server 300. Hence, in some embodiments the network node 100 is configured to perform (optional) step S104:

S104: The network node 100 obtains an indication from a subscription management server 300 of successful EAP based authentication, as performed by the subscription management server 300, of the subscriber entity 200.

The indication might be an EAP SUCCESS message obtained from the subscription management server 300 and addressed to the subscriber entity 200 (i.e., the EAP SUCCESS message is intended to finally reach the subscriber entity 200).

In some aspects, the network node 100 obtains an indication that there is a pending subscription profile download event for the subscriber entity 200. In particular, in some embodiments, the verification that there is a pending subscription profile available for download to the subscriber entity 200 is obtained as an indication from a subscription management server 300. Examples of such an indication will be disclosed next.

In some aspects, the indication is indirect in the form of an EAP SUCCESS message sent from the subscription management server 300 to the subscriber entity 200. That is, in some embodiments, the indication is an EAP SUCCESS message obtained from the subscription management server 300 and addressed to the subscriber entity 200.

In some aspects, the indication is an explicit response. In particular, in some embodiments, the indication is obtained from the subscription management server 300 in a response message to a querying. The network node 100 might thus explicitly query the subscription management server 300 if there is pending subscription profile download event for the subscriber entity 200. Therefore, in some embodiments, the network node 100 is configured to perform (optional) step S106:

S106: The network node 100 queries the subscription management server 300 for existence of the pending subscription profile download event for the subscriber entity 200 at the subscription management server 300.

In some aspects the network node 100 receives information of the subscription profile from the subscription management server 300. That is, in some embodiments, the network node 100 is configured to perform (optional) step S108:

S108: The network node 100 obtains subscription profile download event information of the pending subscription profile from a subscription management server 300.

The network node 100 might then provide this information to the subscriber entity 200. Particularly, in some embodiments, as part of completing the network registration, the network node 100 provides, to the subscriber entity 200, the subscription profile download event information of the pending subscription profile.

Figure 3:
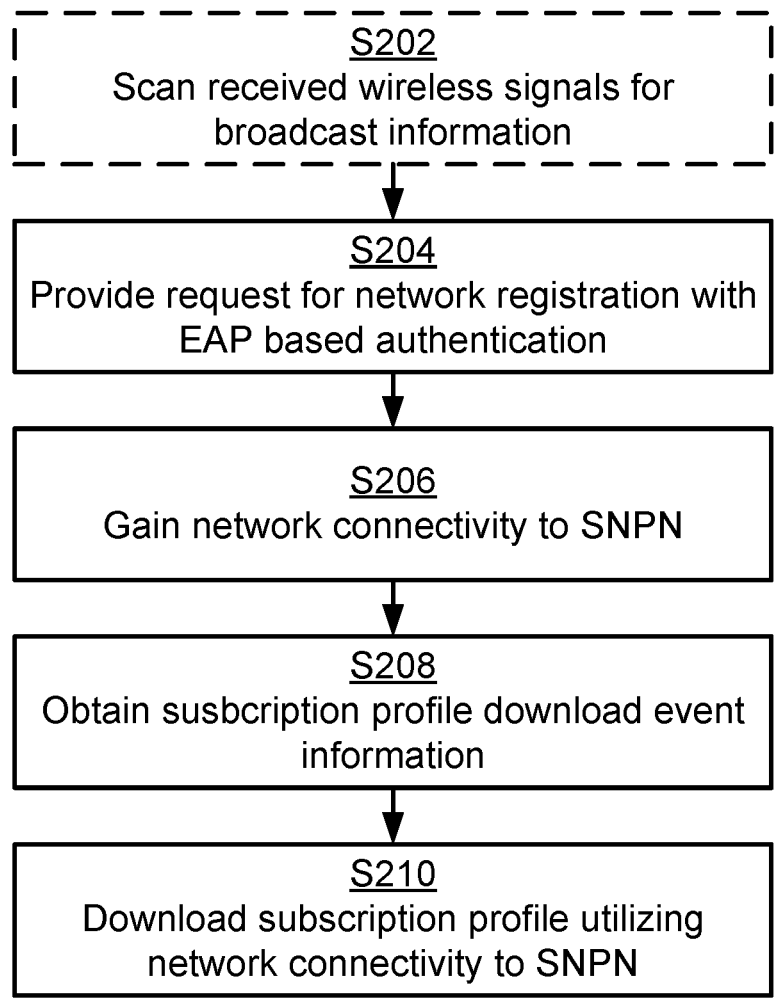

Reference is now made to FIG. 3 illustrating a method for subscription profile download as performed by the subscriber entity 200 according to an embodiment.

S204: The subscriber entity 200 provides a request for network registration with EAP based authentication to an SNPN 30.

As disclosed above, the subscriber entity 200 is granted network access only upon successful authentication and when there is a pending subscription profile available for download.

S206: The subscriber entity 200 gains network connectivity to the SNPN 30 upon successful EAP based authentication of the subscriber entity 200 and upon verification that there is a pending subscription profile available for download to the subscriber entity 200.

S208: The subscriber entity 200 obtains subscription profile download event information of the subscription profile.

S210: The subscriber entity 200 downloads the subscription profile to the subscriber entity 200 whilst utilizing the network connectivity to the SNPN 30.

Embodiments relating to further details of subscription profile download as performed by the subscriber entity 200 will now be disclosed.

In some aspects the subscriber entity 200 scans for broadcast information, e.g. NIDs, in order to detect the SNPN 30. That is, in some embodiments, the subscriber entity 200 is configured with broadcast information of the SNPN 30 to use for initial network connectivity, and configured to perform (optional) step:

S202: The subscriber entity 200 scans received wireless signals for the broadcast information before providing the request for EAP based network registration to the SNPN 30.

There could be different types of broadcast information. In some examples, the broadcast information is a NID of the SNPN 30.

As disclosed above, as part of the network registration, the subscriber entity 200 might performs EAP based authentication with either the network node 100 or the subscription management server 300. As disclosed above, in some examples, the network node 100 is authenticated to the subscriber entity 200 using the certificate that has been issued by the same CI as issued the certificate for the subscriber entity 200.

As disclosed above, in some examples the subscription profile download event information of the pending subscription profile is provided by the network node 100, and thus obtained by the subscriber entity 300 from the SNPN 30, as part of completing the network registration.

Figure 4:
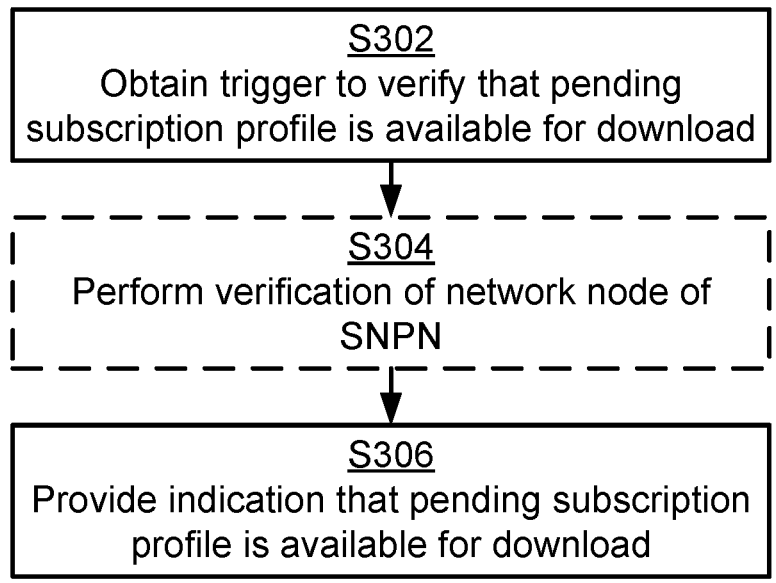

Reference is now made to FIG. 4 illustrating a method for assisting a network node 100 of an SNPN 30 to enable subscription profile download to a subscriber entity 200 as performed by the subscription management server 300 according to an embodiment.

S302: The subscription management server 300 obtains, from the network node 100, a trigger for the subscription management server 300 to verify that a pending subscription profile is available for download to the subscriber entity 200.

In this respect, the trigger might be a request from the network node 100 for the subscription management server 300 to check there is a subscription profile download event for subscription profile download pending for the subscriber entity 200.

S306: The subscription management server 300, then, provides an indication to the network node 100 that the pending subscription profile is available for download to the subscriber entity 200. The indication assists the network node 100 to enable subscription profile download to the subscriber entity 200.

Embodiments relating to further details of assisting a network node 100 of an SNPN 30 to enable subscription profile download to a subscriber entity 200 as performed by the subscription management server 300 will now be disclosed.

In some aspects the subscription management server 300 verifies the network node 100 before sending any information to the network node 100. That is, in some embodiments, the subscription management server 300 is configured to perform (optional) step S304:

S304: The subscription management server 300 performs verification of the network node 100 before providing the indication in step S306 to the network node 100.

In some aspects, the verification of the network node 100 might be performed before the subscription management server 300 obtains the trigger in step S302 from the network node 100. Whether the verification of the network node 100 in step S304 is performed before or after step S302 might also depend on the type of verification that is made; verification relating to authentication might be performed before step S304 whereas verification to policy check might be performed after step S304.

As disclosed above, in some aspects, the subscription management server 300 performs authentication of the subscriber entity 200 on behalf of the network node 100. That is, in some embodiments the trigger is a request for the subscription management server 300 to perform EAP based authentication of the subscriber entity 200 as part of network registration of the subscriber entity 200 to the SNPN 30.

As disclosed above, in some aspects, the network node 100 explicitly queries the subscription management server 300 if there is any download subscription profile download event for the subscriber entity 200. That is, in some embodiments, the trigger is a query from the network node 100 if there is a pending subscription profile download event for the subscriber entity 200 at the subscription management server 300. The indication in step S306 might then be a response message to the query.

As disclosed above, in some aspects, the indication is indirect in the form of an EAP SUCCESS message provided from the subscription management server 300 to the subscriber entity 200. That is, in some embodiments, the indication is an EAP SUCCESS message addressed to the subscriber entity 200.

As disclosed above, in some aspects, the indication in step S306 is accompanied by subscription profile download event information of the pending subscription profile.

Figure 5:
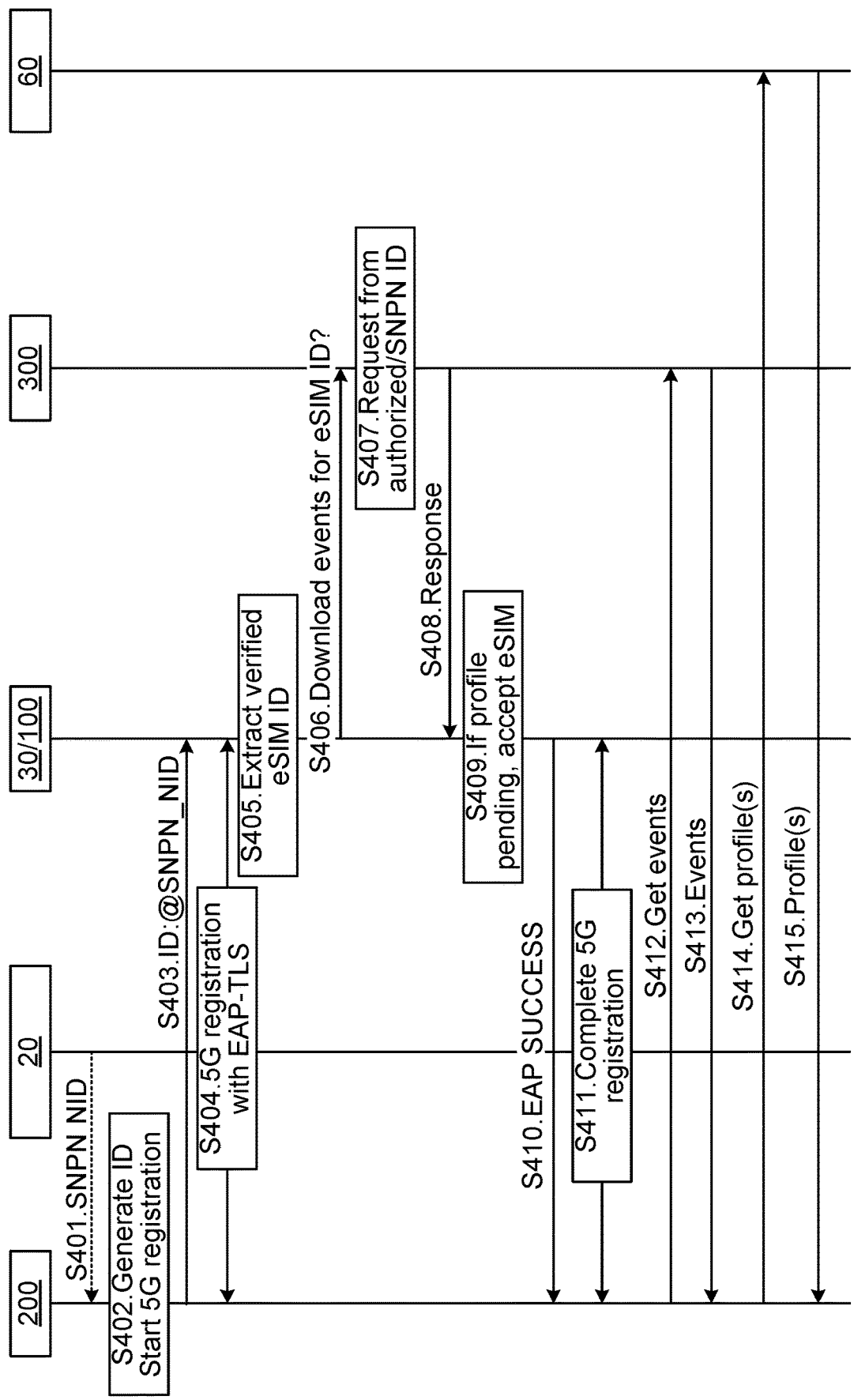
FIGS. 5, 6, and 7 are signalling diagrams according to embodiments.

A first particular embodiment for enabling subscription profile download to a subscriber entity 200 based on at least some of the above disclosed embodiments will now be disclosed in detail with reference to the signalling diagram of FIG. 5.

S401: The PLMN 20 (R) AN advertises the NID of the SNPN 30.

S402: If the subscriber entity 200 has not already done it, it generates its identity, SUCI, e.g. as "@SNPN 30_NID", i.e. the username part is empty and the realm is the SNPN 30 NID advertised by the PLMN 20 (R) AN, which is also pre-configured into the subscriber entity 200. Furthermore, the subscriber entity 200 starts the 5G registration process.

S403: The subscriber entity 200 provides the SUCI generated in step S402 to the PLMN 20 (R) AN. The PLMN 20 (R) AN routes the message to the SNPN 30 based on the realm part of the SUCI.

S404: The subscriber entity 200 and the SNPN 30 continue to run 5G registration, performing the authentication using (e.g.) EAP-TLS based authentication on the subscriber entity ID and associated certificate. The subscriber entity 200 verifies that the SNPN 30 has a CI issued certificate, i.e. is a trusted SNPN 30.

S405: The SNPN 30 receives and verifies the subscriber entity 200 certificate, e.g. subscriber entity ID (EID), and extracts the subscriber entity 200 certificate for use.

S406: The SNPN 30, using a secure channel, connects to the subscription management server 300 and provides the extracted subscriber entity ID in a request to the subscription management server 300 for information about associated subscription profile download events.

S407: The subscription management server 300 verifies that the request is received from an entity authorized to use this interface (i.e. is allowed to request info about subscription profile download events of other subscriber entity IDs). This verification can be performed based on the CI issued certificate (or metadata in it) used by the SNPN 30 towards the subscription management server 300, or based on pre-configured list of trusted SNPNs 30.

S408: If the SNPN 30 is authorized, the subscription management server 300 responds with information about subscription profile download events for the provided subscriber entity ID.

S409: Assuming there is at least one subscription profile download event for the subscriber entity 200, and the EAP-TLS authentication otherwise has been successful (i.e. the subscriber entity 200 uses a valid CI issued certificate), the SNPN 30 accepts the subscriber entity 200 as a valid subscriber.

S410: The SNPN 30 responds with an EAP SUCCESS message, thereby completing a successful EAP-TLS authentication.

S411: The subscriber entity 200 and SNPN 30 complete the 5G registration after which the subscriber entity 200 has network connectivity through the SNPN 30.

S412: The subscriber entity 200 connects to the subscription management server 300 via the SNPN 30 to fetch subscription profile download events.

If the SNPN 30 implements a whitelist for limiting entities to which subscriber entities 200 are allowed to connect, and if the subscription management server 300 the subscriber entity 200 connects to is not on the whitelist, the SNPN 30 could first verify that the subscription management server 300 has a valid CI issued certificate, after which the subscription management server 300 can be added to the whitelist.

S413: The subscription management server 300 provides the subscription profile download event(s) to the subscriber entity 200 via the SNPN 30.

S414: Based on the received subscription profile download event information, the subscriber entity 200 connects to the subscription provisioning server 60 (as indicated by the subscription profile download event) via the SNPN 30 to download a subscription profile.

If the subscription provisioning server 60 is not on the whitelist of the SNPN 30, the SNPN 30 could verify that the contacted subscription provisioning server 60 has a valid CI issued certificate and after that add it to its whitelist (assuming the SNPN 30 uses a whitelist for limiting where subscriber entities 200 are allowed to connect).

S415: The subscriber entity 200 obtains the subscription profile from the subscription provisioning server 60 via the SNPN 30 and can now disconnect from the SNPN 30 and start using its downloaded subscription profile.

Figure 6:
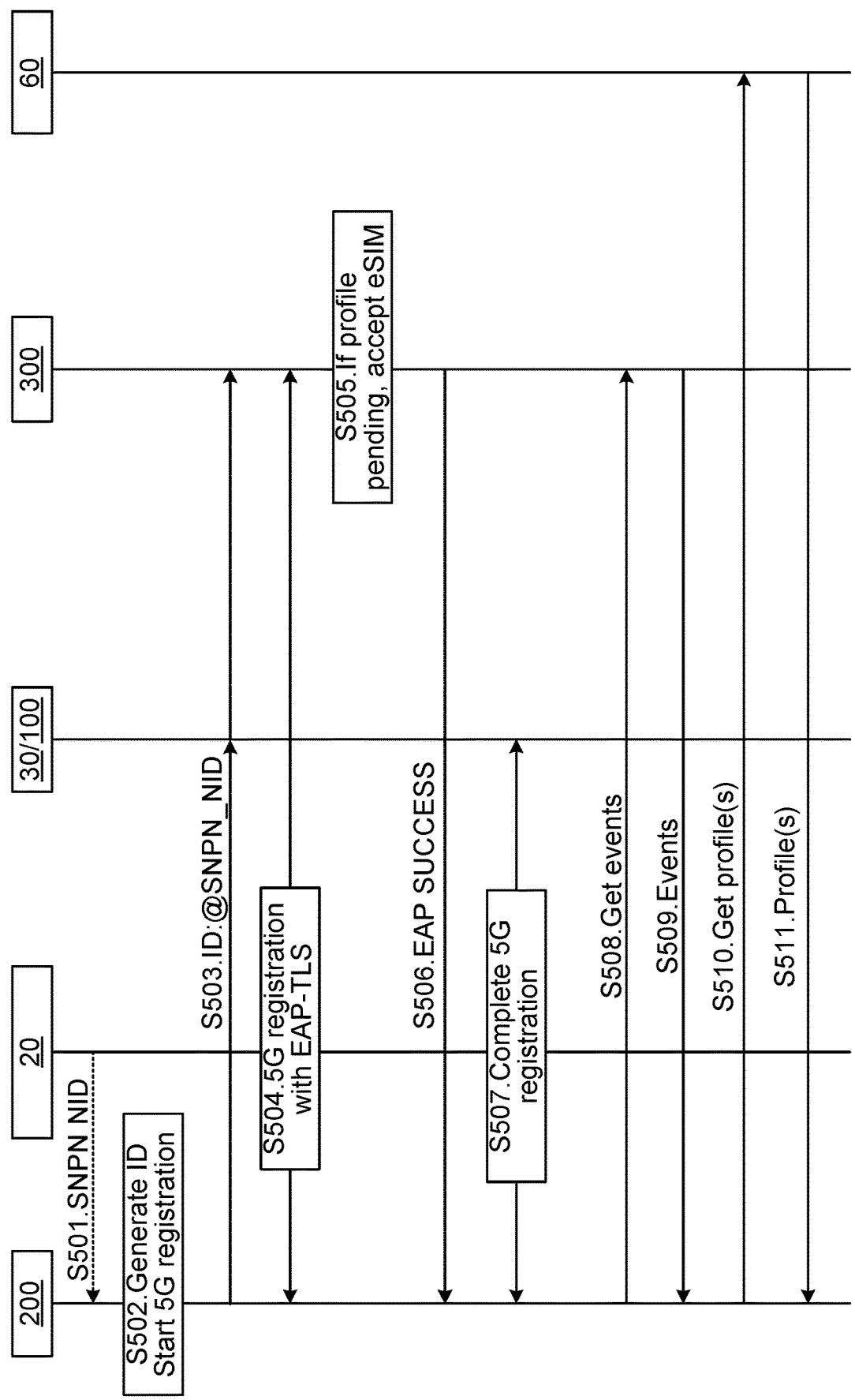
Figure 7:
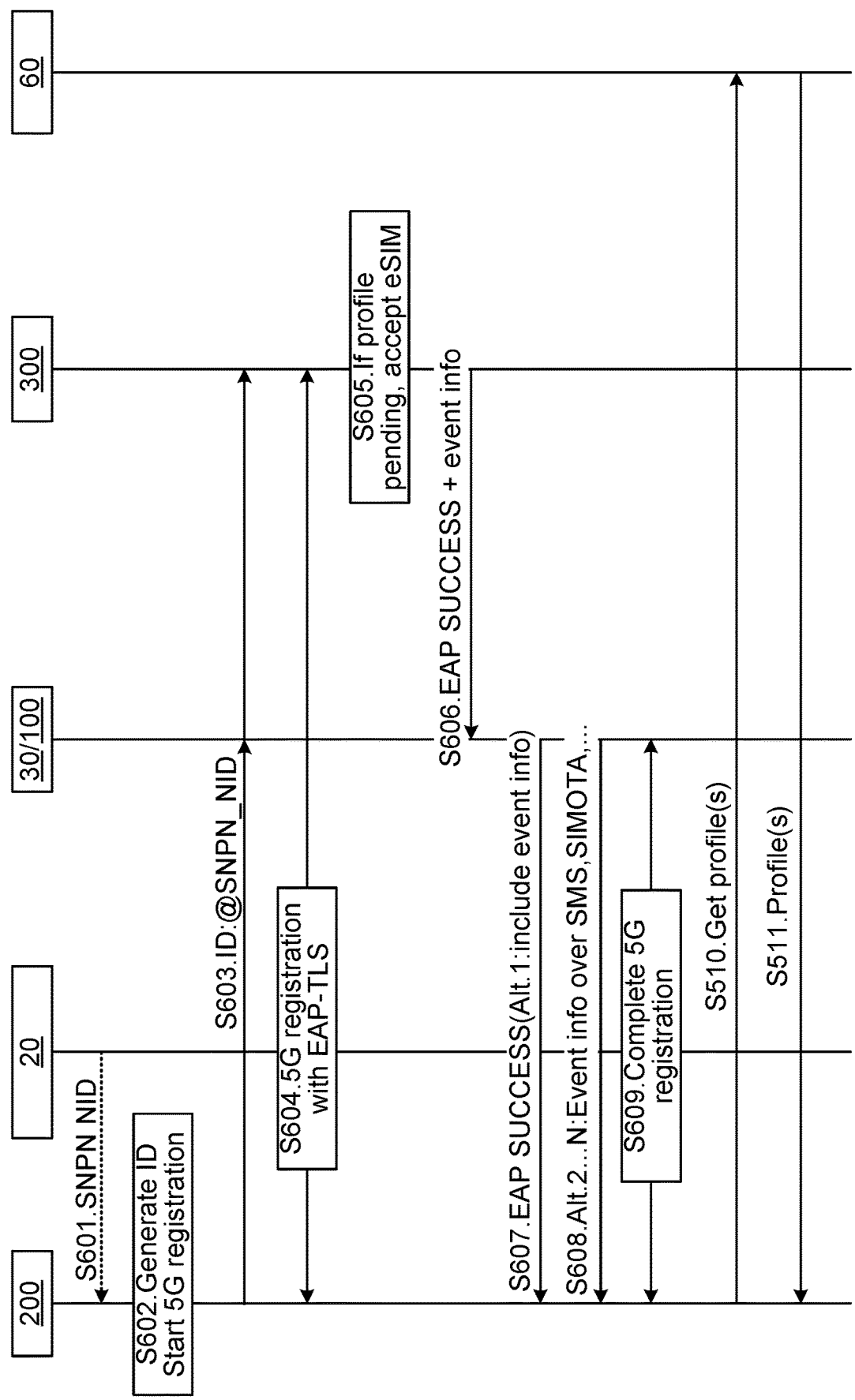

A second particular embodiment for enabling subscription profile download to a subscriber entity 200 based on at least some of the above disclosed embodiments will now be disclosed in detail with reference to the signalling diagram of FIG. 6. The embodiment of FIG. 6 is based on that the authentication part of the registration to an SNPN 30 might be handled by an external AAA server. In some aspects of the herein disclosed embodiments, this external AAA server is the subscription management server 300. It might therefore be assumed that the subscription management server 300 supports EAP based authentication as that is what is be used. The SNPN 30 AMF interacts with the SNPN 30 AUSF, which in turn interacts with the subscription management server 300 acting as external AAA server. Thus, here the AUSF takes the role as an EAP authenticator instead of EAP server. Once the authentication has been completed the AMF receives a key generated during registration and authentication, which can be used for generating the security context between the SNPN 30 and the subscriber entity 200. In this embodiment steps A and B of FIG. 1 are thus merged. One benefit with this embodiment is that separate registration to the SNPN 30 followed by authentication to subscription management server 300 is not required.

S501: The PLMN 20 (R) AN advertises the NID of the SNPN 30.

S502: If the subscriber entity 200 has not already done it, it generates its identity, SUCI, e.g. as "@SNPN 30_NID", i.e. the username part is empty and the realm is the SNPN 30 NID advertised by the PLMN 20 (R) AN, which is also pre-configured into the subscriber entity 200. Furthermore, the subscriber entity 200 starts the 5G registration process.

S503: The subscriber entity 200 provides the SUCI generated in step S502 to the PLMN 20 (R) AN. The PLMN 20 (R) AN routes the message to the SNPN 30 based on the realm part of the SUCI.

S504: As the (e.g.) EAP-TLS based authentication is to be run between the subscriber entity 200 and the external AAA, as represented by the subscription management server 300, the SNPN 30 forwards the subscriber entity ID (i.e., the SUCI) to the subscription management server 300.

S505: The EAP-TLS is run between subscriber entity 200 and subscription management server 300 (subscription management server 300 must implement EAP). The subscriber entity 200 and the subscription management server 300 continue to run 5G registration, performing the authentication using (e.g.) EAP-TLS based authentication on the subscriber entity ID and associated certificate. The subscriber entity 200 verifies that the subscription management server 300 has a CI issued certificate, i.e. is a trusted subscription management server 300.

S506: The subscription management server 300 only accepts the authentication as successful if in addition to successfully running the authentication protocol, there is a subscription profile download event for the subscriber entity ID.

S507a, S507b: An EAP SUCCESS message is sent from the subscription management server 300 via the SNPN 30 to the subscriber entity 200. The SNPN 30 from the EAP SUCCESS message retrieves relevant keying material, and the keying material is not forwarded from the SNPN 30 to the subscriber entity 200.

S508: The subscriber entity 200 and SNPN 30 complete the 5G registration after which the subscriber entity 200 has network connectivity through the SNPN 30.

S509: The subscriber entity 200 connects to the subscription management server 300 via the SNPN 30 to fetch subscription profile download events.

If the SNPN 30 implements a whitelist for limiting entities to which subscriber entities 200 are allowed to connect, and if the subscription management server 300 the subscriber entity 200 connects to is not on the whitelist, the SNPN 30 could first verify that the subscription management server 300 has a valid CI issued certificate, after which the subscription management server 300 can be added to the whitelist.

S510: The subscription management server 300 provides the subscription profile download event to the subscriber entity 200 via the SNPN 30.

S511: Based on the received subscription profile download event information, the subscriber entity 200 connects to the subscription provisioning server 60 (as indicated by the subscription profile download event) via the SNPN 30 to download a subscription profile.

If the subscription provisioning server 60 is not on the whitelist of the SNPN 30, the SNPN 30 could verify that the contacted subscription provisioning server 60 has a valid CI issued certificate and after that add it to its whitelist (assuming the SNPN 30 uses a whitelist for limiting where subscriber entities 200 are allowed to connect).

S512: The subscriber entity 200 obtains the subscription profile from the subscription provisioning server 60 via the SNPN 30 and can now disconnect from the SNPN 30 and start using its downloaded subscription profile.

A third particular embodiment for enabling subscription profile download to a subscriber entity 200 based on at least some of the above disclosed embodiments will now be disclosed in detail with reference to the signalling diagram of FIG. 6. The embodiment of FIG. 6 is based on removing the explicit step C of FIG. 1; the subscription profile download event information could be pushed to the subscriber entity 200 as part of the network registration if the subscription management server 300 provides the relevant information to the SNPN 30 (either visible to the SNPN 30 or as an encrypted blob that only the subscriber entity 200 can decrypt). The subscription management server 300 could in the EAP SUCCESS message to the SNPN 30 send the relevant parameters of the subscription profile download event, e.g. Activation Code (at least subscription provisioning server 60 address and activation code token or the full AC). In this way the subscriber entity 200 does not need to separately contact the subscription management server 300 for obtaining the subscription profile download event information. Rather, after successful registration, the subscriber entity 200 would have the AC and could based on the AC connect to the subscription provisioning server 60 via the SNPN 30 and download the subscription profile.

S601: The PLMN 20 (R) AN advertises the NID of the SNPN 30.

S602: If the subscriber entity 200 has not already done it, it generates its identity, SUCI, e.g. as "@SNPN 30_NID", i.e. the username part is empty and the realm is the SNPN 30 NID advertised by the PLMN 20 (R) AN, which is also pre-configured into the subscriber entity 200. Furthermore, the subscriber entity 200 starts the 5G registration process.

S603: The subscriber entity 200 provides the SUCI generated in step S602 to the PLMN 20 (R) AN. The PLMN 20 (R) AN routes the message to the SNPN 30 based on the realm part of the SUCI.

S604: As the (e.g.) EAP-TLS based authentication is to be run between the subscriber entity 200 and the external AAA, as represented by the subscription management server 300, the SNPN 30 forwards the subscriber entity ID (i.e., the SUCI) to the subscription management server 300.

S605: The EAP-TLS is run between subscriber entity 200 and subscription management server 300 (subscription management server 300 must implement EAP). The subscriber entity 200 and the subscription management server 300 continue to run 5G registration, performing the authentication using (e.g.) EAP-TLS based authentication on the subscriber entity ID and associated certificate. The subscriber entity 200 verifies that the subscription management server 300 has a CI issued certificate, i.e. is a trusted subscription management server 300.

S606: The subscription management server 300 only accepts the authentication as successful if in addition to successfully running the authentication protocol, there is a subscription profile download event for the subscriber entity ID.

S607a, S607b: An EAP SUCCESS message is sent from the subscription management server 300 via the SNPN 30 to the subscriber entity 200. The EAP SUCCESS message (or a separate message sent from the subscription management server 300 via the SNPN 30 to the subscriber entity 200) comprises subscription profile download event information.

The subscription profile download event information can be provided as plaintext sine the communication channel between SNPN 30 and subscription management server 300 is secure or be encrypted by a key generated during the authentication exchange (or by a new key generated from keying material generated during the authentication exchange) so that the SNPN 30 does not learn the content of the subscription profile download event. The SNPN 30 could, alternatively and optionally, if it can read the content of the subscription profile download event, whitelist the subscription provisioning server 60 indicated in the subscription profile download event so that the subscriber entity 200 is allowed to access it for subscription profile download, i.e. the subscription provisioning server 60 is configured in the UPF as an accepted destination for outgoing traffic.

The SNPN 30 from the EAP SUCCESS message retrieves relevant keying material, and the keying material is not forwarded from the SNPN 30 to the subscriber entity 200.

S608: The SNPN 30 communicates the subscription profile download event information to the subscriber entity 200, either as additional data in the EAP SUCCESS message sent from the SNPN 30 to subscriber entity 200, or in another message, such as in a short message service (SMS) text message or using a UE parameter update (UPE) message.

S609: The subscriber entity 200 obtains the subscription profile from the subscription provisioning server 60 via the SNPN 30 and can now disconnect from the SNPN 30 and start using its downloaded subscription profile.

Since the subscriber entity 200 from step S608 already has relevant information of the subscription profile download event the subscriber entity 200 does not need to fetch any download subscription profile download event from the subscription management server 300 and instead proceeds to download the subscriber entity 200 subscription profile from subscription provisioning server 60 in step S609 as soon as the subscriber entity 200 has completed network registration with the SNPN 30.

Figure 8:
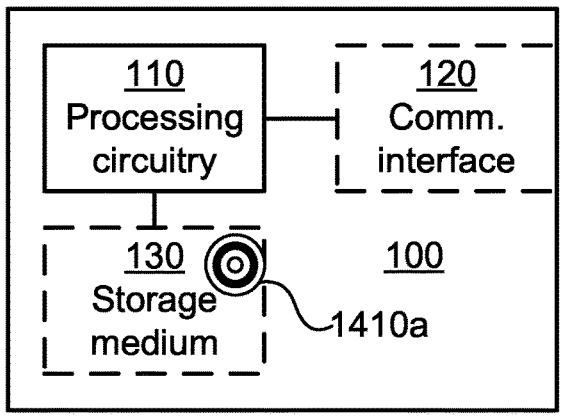
FIG. 8 is a schematic diagram showing functional units of a network node according to an embodiment.

FIG. 8 schematically illustrates, in terms of a number of functional units, the components of a network node 100 according to an embodiment. Processing circuitry 110 is provided using any combination of one or more of a suitable central processing unit (CPU), multiprocessor, microcontroller, digital signal processor (DSP), etc., capable of executing software instructions stored in a computer program product 1410a (as in FIG. 14), e.g. in the form of a storage medium 130. The processing circuitry 110 may further be provided as at least one application specific integrated circuit (ASIC), or field programmable gate array (FPGA).

Particularly, the processing circuitry 110 is configured to cause the network node 100 to perform a set of operations, or steps, as disclosed above. For example, the storage medium 130 may store the set of operations, and the processing circuitry 110 may be configured to retrieve the set of operations from the storage medium 130 to cause the network node 100 to perform the set of operations. The set of operations may be provided as a set of executable instructions. Thus the processing circuitry 110 is thereby arranged to execute methods as herein disclosed.

The storage medium 130 may also comprise persistent storage, which, for example, can be any single one or combination of magnetic memory, optical memory, solid state memory or even remotely mounted memory.

The network node 100 may further comprise a communications interface 120 for communications with other functions, nodes, entities, and devices of the communication network 10. As such the communications interface 120 may comprise one or more transmitters and receivers, comprising analogue and digital components.

The processing circuitry 110 controls the general operation of the network node 100 e.g. by sending data and control signals to the communications interface 120 and the storage medium 130, by receiving data and reports from the communications interface 120, and by retrieving data and instructions from the storage medium 130. Other components, as well as the related functionality, of the network node 100 are omitted in order not to obscure the concepts presented herein.

Figure 9:
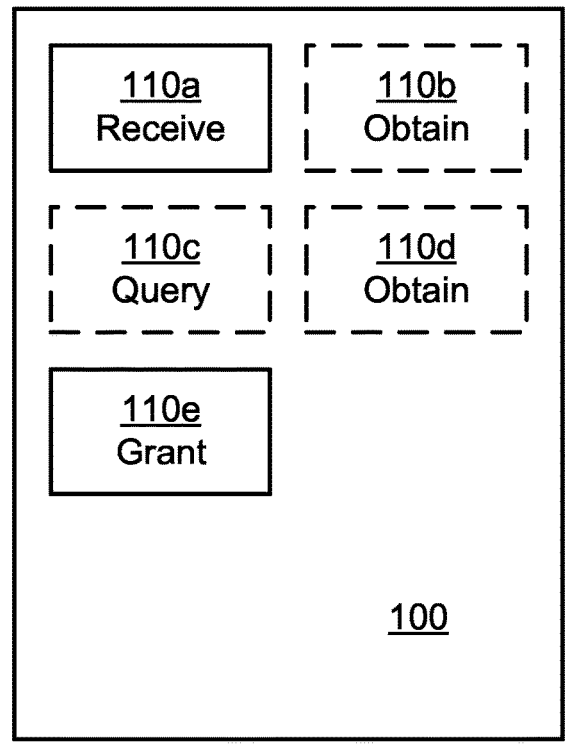
FIG. 9 is a schematic diagram showing functional modules of a network node according to an embodiment.

FIG. 9 schematically illustrates, in terms of a number of functional modules, the components of a network node 100 according to an embodiment. The network node 100 of FIG. 9 comprises a number of functional modules; a receive module 110a configured to perform step S102, and a grant module 110e configured to perform step S110. The network node 100 of FIG. 9 may further comprise a number of optional functional modules, such as any of an obtain module 110b configured to perform step S104, a query module 110c configured to perform step S106, an obtain module 110d configured to perform step S108. In general terms, each functional module 110a-110d may be implemented in hardware or in software. Preferably, one or more or all functional modules 110a-110d may be implemented by the processing circuitry 110, possibly in cooperation with the communications interface 120 and the storage medium 130. The processing circuitry 110 may thus be arranged to from the storage medium 130 fetch instructions as provided by a functional module 110a-110d and to execute these instructions, thereby performing any steps of the network node 100 as disclosed herein.

Figure 10:
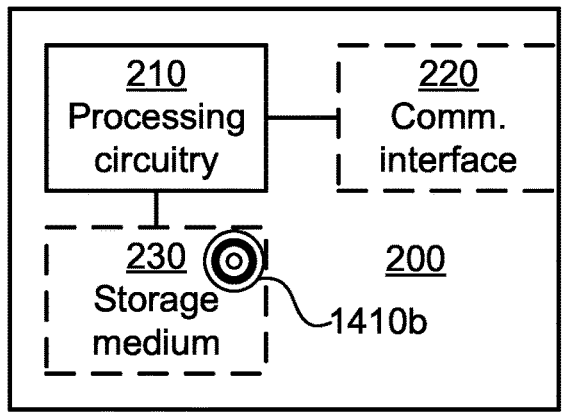
FIG. 10 is a schematic diagram showing functional units of a subscriber entity according to an embodiment.

FIG. 10 schematically illustrates, in terms of a number of functional units, the components of a subscriber entity 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1410b (as in FIG. 14), e.g. in the form of a storage medium 230. The processing circuitry 210 may further be provided as at least one application specific integrated circuit (ASIC), or field programmable gate array (FPGA).

Particularly, the processing circuitry 210 is configured to cause the subscriber entity 200 to perform a set of operations, or steps, as disclosed above. For example, the storage medium 230 may store the set of operations, and the processing circuitry 210 may be configured to retrieve the set of operations from the storage medium 230 to cause the subscriber entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The subscriber entity 200 may further comprise a communications interface 220 for communications with other functions, nodes, entities, and devices of the communication network 10. As such the communications interface 220 may comprise one or more transmitters and receivers, comprising analogue and digital components.

The processing circuitry 210 controls the general operation of the subscriber entity 200 e.g. by sending data and control signals to the communications interface 220 and the storage medium 230, by receiving data and reports from the communications interface 220, and by retrieving data and instructions from the storage medium 230. Other components, as well as the related functionality, of the subscriber entity 200 are omitted in order not to obscure the concepts presented herein.

Figure 11:
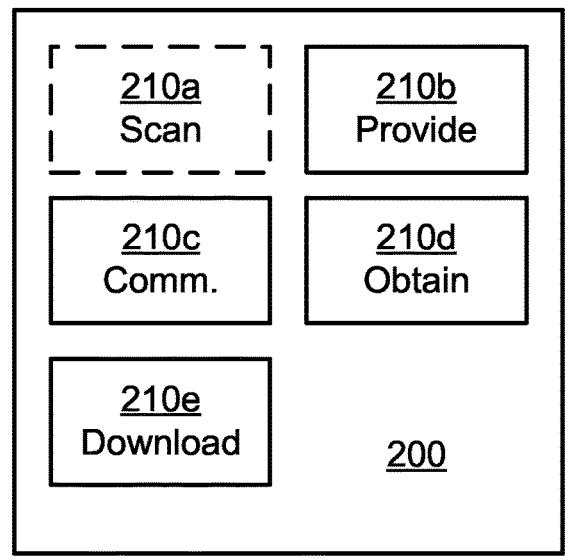
FIG. 11 is a schematic diagram showing functional modules of a subscriber entity according to an embodiment.

FIG. 11 schematically illustrates, in terms of a number of functional modules, the components of a subscriber entity 200 according to an embodiment. The subscriber entity 200 of FIG. 11 comprises a number of functional modules; a provide module 210b configured to perform step S204, a communication module 210c configured to perform step S206, an obtain module 210d configured to perform step S208, and a download module 210e configured to perform step S210. The subscriber entity 200 of FIG. 11 may further comprise a number of optional functional modules, such as a scan module 210a configured to perform step S202. In general terms, each functional module 210a-210e may be implemented in hardware or in software. Preferably, one or more or all functional modules 210a-210e may be implemented by the processing circuitry 210, possibly in cooperation with the communications interface 220 and the storage medium 230. The processing circuitry 210 may thus be arranged to from the storage medium 230 fetch instructions as provided by a functional module 210a-210e and to execute these instructions, thereby performing any steps of the subscriber entity 200 as disclosed herein.

Figure 12:
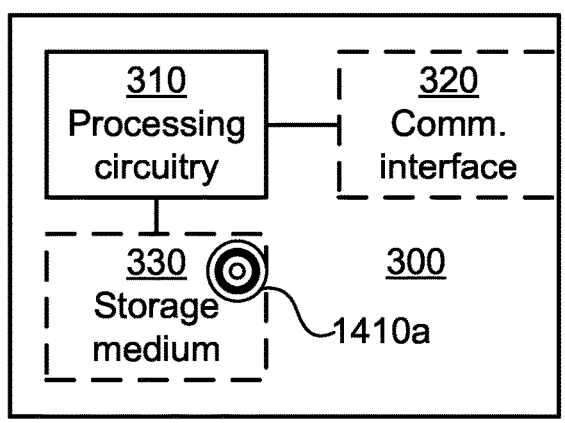
FIG. 12 is a schematic diagram showing functional units of a subscription management server according to an embodiment.

FIG. 12 schematically illustrates, in terms of a number of functional units, the components of a subscription management server 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1410c (as in FIG. 14), e.g. in the form of a storage medium 330. The processing circuitry 310 may further be provided as at least one application specific integrated circuit (ASIC), or field programmable gate array (FPGA).

Particularly, the processing circuitry 310 is configured to cause the subscription management server 300 to perform a set of operations, or steps, as disclosed above. For example, the storage medium 330 may store the set of operations, and the processing circuitry 310 may be configured to retrieve the set of operations from the storage medium 330 to cause the subscription management server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The subscription management server 300 may further comprise a communications interface 320 for communications with other functions, nodes, entities, and devices of the communication network 10. As such the communications interface 320 may comprise one or more transmitters and receivers, comprising analogue and digital components.

The processing circuitry 310 controls the general operation of the subscription management server 300 e.g. by sending data and control signals to the communications interface 320 and the storage medium 330, by receiving data and reports from the communications interface 320, and by retrieving data and instructions from the storage medium 330. Other components, as well as the related functionality, of the subscription management server 300 are omitted in order not to obscure the concepts presented herein.

Figure 13:
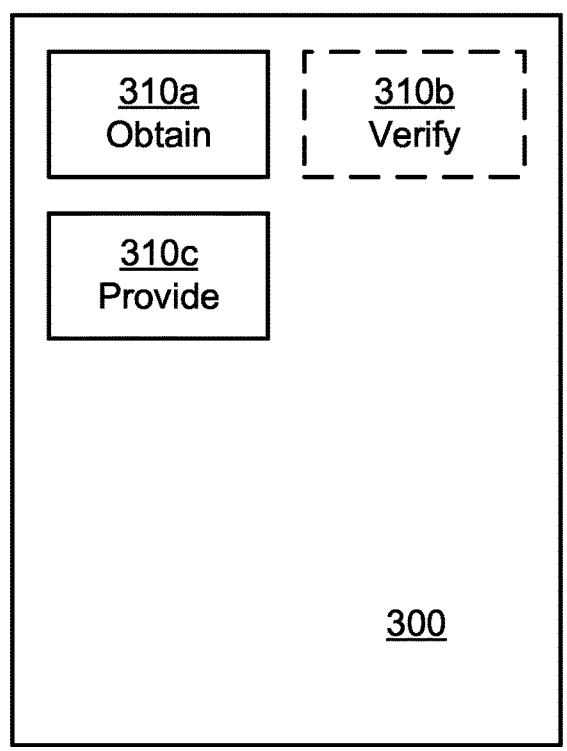
FIG. 13 is a schematic diagram showing functional modules of a subscription management server according to an embodiment.

FIG. 13 schematically illustrates, in terms of a number of functional modules, the components of a subscription management server 300 according to an embodiment. The subscription management server 300 of FIG. 13 comprises a number of functional modules; an obtain module 310a configured to perform step S302, and a provide module 310c configured to perform step S306. The subscription management server 300 of FIG. 13 may further comprise a number of optional functional modules, such as a verify module 310b configured to perform step S304. In general terms, each functional module 310a-310c may be implemented in hardware or in software. Preferably, one or more or all functional modules 310a-310c may be implemented by the processing circuitry 310, possibly in cooperation with the communications interface 320 and the storage medium 330. The processing circuitry 310 may thus be arranged to from the storage medium 330 fetch instructions as provided by a functional module 310a-310c and to execute these instructions, thereby performing any steps of the subscription management server 300 as disclosed herein.

Figure 14:
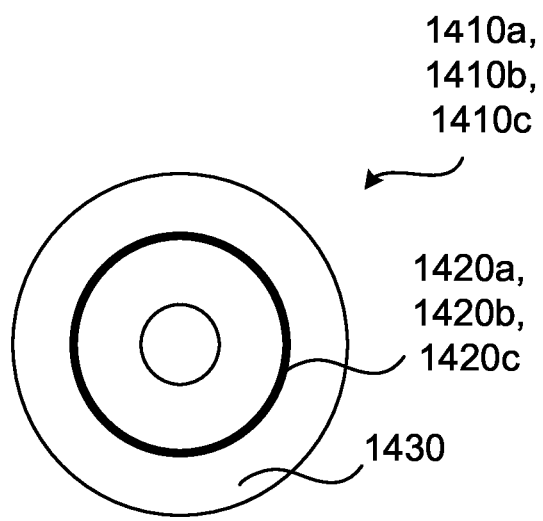
FIG. 14 shows one example of a computer program product comprising computer readable means according to an embodiment.

FIG. 14 shows one example of a computer program product 1410a, 1410b, 1410c comprising computer readable means 1430. On this computer readable means 1430, a computer program 1420a can be stored, which computer program 1420a can cause the processing circuitry 110 and thereto operatively coupled entities and devices, such as the communications interface 120 and the storage medium 130, to execute methods according to embodiments described herein. The computer program 1420a and/or computer program product 1410a may thus provide means for performing any steps of the network node 100 as herein disclosed. On this computer readable means 1430, a computer program 1420b can be stored, which computer program 1420b can cause the processing circuitry 210 and thereto operatively coupled entities and devices, such as the communications interface 220 and the storage medium 230, to execute methods according to embodiments described herein. The computer program 1420*b* and/or computer program product 1410*b* may thus provide means for performing any steps of the subscriber entity 200 as herein disclosed. On this computer readable means 1430, a computer program 1420*c* can be stored, which computer program 1420*c* can cause the processing circuitry 310 and thereto operatively coupled entities and devices, such as the communications interface 320 and the storage medium 330, to execute methods according to embodiments described herein. The computer program 1420*c* and/or computer program product 1410*c* may thus provide means for performing any steps of the subscription management server 300 as herein disclosed.

In the example of FIG. 14, the computer program product 1410*a*, 1410*b*, 1410*c* is illustrated as an optical disc, such as a CD (compact disc) or a DVD (digital versatile disc) or a Blu-Ray disc. The computer program product 1410*a*, 1410*b*, 1410*c* could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1420*a*, 1420*b*, 1420*c* is here schematically shown as a track on the depicted optical disk, the computer program 1420*a*, 1420*b*, 1420*c* can be stored in any way which is suitable for the computer program product 1410*a*, 1410*b*, 1410*c*.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for enabling subscription profile download to a subscriber entity, the method being performed by a network node of an SNPN, the method comprising:
   receiving a request from the subscriber entity for network registration with EAP based authentication to the SNPN; and
   granting network connectivity for the subscriber entity to the SNPN by completing the network registration upon successful EAP based authentication of the subscriber entity and upon verification that there is a pending subscription profile available for download to the subscriber entity, the network connectivity enabling subscription profile download to the subscriber entity.

2. The method according to claim 1, wherein the EAP based authentication is based on EAP-TLS authentication of the subscriber entity.

3. The method according to claim 1, wherein the EAP based authentication comprises verifying a CI issued certificate of the subscriber entity or an identifier of the subscriber entity.

4. The method according to claim 1, wherein the EAP based authentication of the subscriber entity is performed by the network node.

5. The method according to claim 1, further comprising:
   obtaining an indication from a subscription management server of successful EAP based authentication, as performed by the subscription management server, of the subscriber entity.

6. The method according to claim 5, wherein the indication is an EAP SUCCESS message obtained from the subscription management server and addressed to the subscriber entity.

7. The method according to claim 1, wherein the verification that there is a pending subscription profile available for download to the subscriber entity is obtained as an indication from a subscription management server.

8. The method according to claim 7, wherein the indication is an EAP SUCCESS message obtained from the subscription management server and addressed to the subscriber entity.

9. The method according to claim 7, wherein the indication is obtained from the subscription management server in a response message to a querying.

10. The method according to claim 9, further comprising:
    querying the subscription management server for existence of the pending profile download event for the subscriber entity at the subscription management server.

11. The method according to claim 1, further comprising:
    obtaining event information of the pending subscription profile from a subscription management server.

12. The method according to claim 11, wherein, as part of completing the network registration, the network node provides, to the subscriber entity, the event information of the pending subscription profile.

13. A method for subscription profile download, the method being performed by a subscriber entity, the method comprising:
    a request for network registration with EAP based authentication to an SNPN;
    gaining network connectivity to the SNPN upon successful EAP based authentication of the subscriber entity and upon verification that there is a pending subscription profile available for download to the subscriber entity;
    obtaining event information of the subscription profile; and
    downloading the subscription profile to the subscriber entity whilst utilizing the network connectivity to the SNPN.

14. The method according to claim 13, wherein the subscriber entity is configured with broadcast information of the SNPN to use for initial network connectivity, the method further comprising:
    scanning received wireless signals for the broadcast information before providing the request for EAP based network registration to the SNPN.

15. The method according to claim 14, wherein the broadcast information is a NID of the SNPN.

16. The method according to claim 13, wherein, as part of the network registration, the subscriber entity performs EAP based authentication with a subscription management server.

17. The method according to claim 13, wherein the event information of the pending subscription profile is obtained from the SNPN as part of completing the network registration.

18. A network node of an SNPN for enabling subscription profile download to a subscriber entity, the network node comprising processing circuitry, the processing circuitry being configured to cause the network node to:

receive a request from the subscriber entity for network registration with EAP based authentication to the SNPN; and grant network connectivity for the subscriber entity to the SNPN by completing the network registration upon successful EAP based authentication of the subscriber entity and upon verification that there is a pending subscription profile available for download to the subscriber entity, the network connectivity enabling subscription profile download to the subscriber entity.

19. A subscriber entity for subscription profile download, the subscriber entity comprising processing circuitry, the processing circuitry being configured to cause the subscriber entity to:

provide a request for network registration with EAP based authentication to an SNPN;

gain network connectivity to the SNPN upon successful EAP based authentication of the subscriber entity and upon verification that there is a pending subscription profile available for download to the subscriber entity;

obtain event information of the subscription profile; and download the subscription profile to the subscriber entity whilst utilizing the network connectivity to the SNPN.

\* \* \* \* \*